Patented Sept. 28, 1937

2,094,366

UNITED STATES PATENT OFFICE 2,094,366

HERBICIDE

Irving E. Melhus, Ames, Iowa, assignor to Chipman Chemical Company, Inc., Middlesex, N. J., a corporation of New York No Drawing. Application January 25, 1935, Serial No. 3,389. Renewed January 2, 1937

10 Claims. (Cl. 167—45)

The present invention relates to herbicides, and more particularly to an improved weed killer of chlorate and acetate having increased lethal action and decreased deflagration.

It is well known that sodium chlorate has been widely used as a herbicide. Heretofore large quantities of chlorate have been used in the destruction of noxious weeds such as Canada thistle, quack grass, perennial sow thistle, European bindweed, etc. Usually, it has been applied in solutions in the proportion of about one pound of chlorate for each gallon of water. About one to about two gallons of solution have been applied to a square rod of land of vegetated area. In the use of chlorate it has been necessary to use great care in applying the chlorate, due to its high rate of deflagration when in contact with organic matter. Thus combustible materials such as cloth, leather, wood, or even sprayed vegetation, when impregnated with a solution of sodium chlorate, and subsequently dried, burned with such extreme rapidity as to constitute a dangerous fire hazard. Not only has a great deal of property been destroyed but men have also been burned. Sodium chlorate although a successful weed killer with many forms of shallow rooted perennials and most annuals, has been somewhat unsuccessful with the deeper rooted perennials, such as, bindweed or white top weed, where the penetration of the chlorate seemed limited. Although many attempts have been made to improve lethal action of chlorate and to reduce its fire hazard, such as, for example, highly deliquescent salts, no proposal, as far as I am aware, has been wholly satisfactory and successful.

I have discovered a novel combination which overcomes the disadvantages of sodium chlorate and which solves the foregoing problems.

It is an object of the present invention to provide a weed killer of the chlorate type having increased lethal effect over sodium chlorate and increased penetration into deep rooted system plants, such as bindweed or white top while causing a very marked reduced rate of deflagration when in combination with organic matter as compared with sodium chlorate in combination with organic matter.

It is another object of the invention to provide an improved weed killer of the chlorate type having a greatly increased herbicidal action and which is relatively simple, economical and practical.

It is within the contemplation of the invention to provide a novel combination containing sodium chlorate which has increased activity over ordinary sodium chlorate weed killers while at the same time possessing a greatly reduced fire hazard.

Other objects and advantages of the invention will become apparent from the following description:

I have discovered that the combination of sodium chlorate and sodium acetate produces a weed killer with improved and increased lethal action over prior chlorate herbicides and with a decreased rate of deflagration with respect to said prior herbicides. In carrying my discovery into practice, it is preferred to utilize about five (5) to about nine (9) parts by weight of sodium chlorate and about one (1) to about five (5) parts by weight of sodium acetate to form the improved herbicide. In using the improved herbicide, sufficient water should be added to properly cover or spray about one (1) to about two (2) pounds of the mixture on a square rod of land of vegetated area, or approximately one (1) to two (2) gallons. In this connection more or less water can be used depending upon particular circumstances. The water is a vehicle of distribution and facilitates the use in various types of spray apparatus. Excellent results both as to increased lethal action of the chlorate and the reduction of the rate of deflagration have been secured by the use of approximately two (2) parts by weight of sodium acetate to about eight (8) parts by weight of sodium chlorate. It is preferred to mix sodium acetate and sodium chlorate wet, or even to dissolve them in water. After mixing wet or in water, the mixture can be dried. It is to be noted that sodium chlorate and sodium acetate should not be mixed together in the anhydrous condition because such an anhydrous mixture is combustible and even is subject to explosion under appropriate conditions. Of course, solutions may be separately made of the chlorate and of the acetate and the two solutions mixed together in proper proportions. It is also possible to spray the vegetation or the like with a solution of sodium chlorate and then with a solution of sodium acetate.

In accordance with the principles of the present invention, a chlorate-acetate solution was made up and was tested for its lethal action by spraying various plants and vegetation. These tests demonstrated that the novel chlorate-acetate combination was more effective than the chlorate alone. Comparative tests were conducted with bindweed and white top which proved that the chlorate-acetate combination containing eight (8) pounds of sodium chlorate and two (2) pounds of sodium acetate is as effective as, or is more effective than, about twelve (12) pounds of sodium chlorate on an equal given area and an equal amount of bindweed and white top. Generally speaking, the lethal action of the novel combination was approximately one and one-half (1½) to two (2) times that of chlorate alone.

It has been found that the novel chlorate-acetate combination possesses a substantially lower rate of deflagration than that of ordinary sodium chlorate. Tests carried out with impregnated cotton gauze showed that the novel chlorate-acetate combination had a much lower rate than sodium chlorate alone.

When carrying out the foregoing test, impregnated samples of cotton gauze (about 2" by about 5") are dried preferably on a hot water bath or the like. The dried impregnated cotton gauze sample is then ignited and the total time of burning of the gauze in seconds is noted. In a series of 25 tests the gauze impregnated with a 10% sodium chlorate solution burned in about 10.8 seconds (average), whereas a piece of gauze impregnated with a 10% sodium chlorate solution carrying about 4 parts by weight of sodium acetate burned in about 57 seconds (average). In these tests the chlorate-impregnated gauze samples burned completely with a flame, whereas 22.2% of the chlorate-acetate-impregnated gauze samples burned incompletely, 33.3% complete with flame, and 44.5% complete with smoldering. Dried gauze without treatment burned in thirty-one (31) seconds (average), showing that the acetate mixture with chlorate causes slower deflagration than the untreated material, and is, therefore, an inhibitor of combustion.

Although the present invention has been described in connection with a preferred embodiment thereof, it is to be understood that those skilled in the art may resort to variations and modifications which are to be considered within the purview of the appended claims. Thus, instead of using sodium chlorate, another soluble chlorate, especially one containing a member of the alkali or alkaline earth family, may be used, and instead of using sodium acetate, another soluble acetate, especially an acetate containing a member of the alkali or alkaline earth family or a soluble compound containing a radical of an organic acid of the aliphatic series, such as formate, butyrate, etc. may be used. For example potassium chlorate and sodium acetate have given relatively equivalent results but the combination is slightly more expensive to use than the ones referred to hereinabove.

I claim:

1. A herbicidal composition comprising sodium chlorate and sodium acetate.

2. A herbicidal composition comprising sodium chlorate and sodium acetate in the proportion of from about one (1) to about five (5) parts by weight of sodium acetate to about five (5) parts to about nine (9) parts of chlorate.

3. A herbicidal composition containing a chlorate containing a metal of the group consisting of alkali metals and alkaline earth metals and a soluble acetate containing a metal of the group consisting of alkali metals and alkaline earth metals.

4. A herbicidal composition comprising sodium chlorate and sodium acetate in the proportion of from about one (1) to about five (5) parts by weight of sodium acetate to about five (5) parts to about nine (9) parts of chlorate and about eight (8) to about two hundred and twenty-four (224) parts of water.

5. A herbicidal composition comprising sodium chlorate and a soluble compound containing a member of the alkali family and a radical of an aliphatic organic acid of low molecular weight and capable of increasing the lethal action of the chlorate while reducing the rate of deflagration.

6. A herbicidal composition comprising a chlorate containing a metal of the group consisting of alkali metals and alkaline earth metals and a soluble agent containing a member of the group consisting of the alkali family and the alkaline earth family and a radical of an aliphatic organic acid of low molecular weight and adapted to simultaneously increase the lethal action of the chlorate and to reduce the rate of deflagration of the composition.

7. The process of destroying weeds which comprises subjecting weeds to contact with a herbicide containing a chlorate containing a metal of the group consisting of alkali metals and alkaline earth metals and a soluble acetate containing a metal of the group consisting of alkali metals and alkaline earth metals.

8. The process of destroying weeds which comprises subjecting weeds to contact with a herbicide containing sodium chlorate and sodium acetate.

9. The process of destroying weeds which comprises subjecting weeds to contact with an aqueous solution of a herbicide containing a chlorate containing a metal of the group consisting of alkali metals and alkaline earth metals and a soluble acetate containing a metal of the group consisting of alkali metals and alkaline earth metals.

10. The process of destroying weeds which comprises subjecting weeds to contact with a chlorate containing a metal of the group consisting of alkali metals and alkaline earth metals and a soluble compound containing a member of the alkali family and a radical of an aliphatic organic acid of low molecular weight.

IRVING E. MELHUS.